(12) United States Patent
Guzek

(10) Patent No.: US 9,929,766 B1
(45) Date of Patent: Mar. 27, 2018

(54) MOBILE COMPUTING ATTACHMENT DEVICE

(71) Applicant: W. Jason Guzek, Scranton, PA (US)

(72) Inventor: W. Jason Guzek, Scranton, PA (US)

( * ) Notice: Subject to any disclaimer, the term of this patent is extended or adjusted under 35 U.S.C. 154(b) by 0 days.

(21) Appl. No.: 15/335,938

(22) Filed: Oct. 27, 2016

(51) Int. Cl.
*H04B 1/38* (2015.01)
*H04B 1/3888* (2015.01)

(52) U.S. Cl.
CPC .................................. *H04B 1/3888* (2013.01)

(58) Field of Classification Search
CPC .......... H04B 1/38; H04B 1/3888; H04M 1/02
See application file for complete search history.

(56) References Cited

U.S. PATENT DOCUMENTS

| 9,185,953 | B2 * | 11/2015 | Whitten | A45C 11/00 |
| 9,408,446 | B2 * | 8/2016 | Liebers | A45C 11/00 |
| 2014/0057687 | A1 * | 2/2014 | Yoo | H04B 1/3888 |
| | | | | 455/575.8 |
| 2014/0228082 | A1 * | 8/2014 | Morrow | H04B 1/3888 |
| | | | | 455/575.8 |
| 2016/0359515 | A1 * | 12/2016 | Yoo | H04B 1/3888 |
| 2016/0373152 | A1 * | 12/2016 | Schmidt | H04B 1/3877 |
| 2017/0099922 | A1 * | 4/2017 | Guerdrum | A45F 5/021 |
| 2017/0134063 | A1 * | 5/2017 | Lee | H04B 1/3888 |
| 2017/0183052 | A1 * | 6/2017 | Whitten | B62J 11/00 |

OTHER PUBLICATIONS

Dual Phone Case http://www.bing.com/videos/search?q=double+cell+phone+case&&view=detail&mid=32DFFC8C6D65E0A7952832DFFC8C6D65E0A7952B&FORM=VRDGAR.
Double Decker http://www.storyleather.cm/smart-phone-cases/custom-made-phone-cases/double-decker.html.

* cited by examiner

*Primary Examiner* — Blane Jackson
(74) *Attorney, Agent, or Firm* — Zale Patent Law, Inc.; James R. McDaniel; Lawrence P. Zala

(57) ABSTRACT

An attachment system is disclosed which employs a main set of attachment elements attached to a case for a mobile computing device, such as a mobile phone, computing tablet or other computing device which can be carried with the user. The attachment system may also be part of the mobile computing device. These attachment elements are designed to attach to attachment elements connected to, or built into another mobile computing device. This allows a user to keep track of a first phone while using a second phone. In alternative embodiments, the phone may be connected back to back to allow simultaneous use of both phones, front to back to protect the screen of one while using the other, or front to front to protect both screens when neither is being used. Also, it may be embodied as a docking structure which is fixed to a wall or other structure. The mobile computing device removeably attaches to the docking structure to hold the phone for use and/or storage.

16 Claims, 4 Drawing Sheets

MOBILE COMPUTING ATTACHMENT DEVICE

CROSS-REFERENCE TO RELATED APPLICATIONS

Not Applicable.

STATEMENT REGARDING FEDERALLY SPONSORED RESEARCH

Not Applicable.

BACKGROUND

1. Field of Invention

The present invention relates to device for holding a mobile computing device, and more particularly a device for holding a mobile computing device to another mobile computing device or a surface.

2. Description of Related Art

Now that mobile computing devices, including smart phones, cell phones, computing tablets, iPads, laptop computers, etc. perform many functions, users are becoming increasingly dependent upon them. Users now tend to carry these devices everywhere. Since they cannot be placed on wet surfaces, cannot be stepped on, dropped, or scratched, users are reluctant to put them down. Therefore, they tend to carry them everywhere, or leave in secure area for fear of losing or breaking them. This leaves the user with one free hand to do most everything else. This also possibly requires the user to continually check the mobile devices at two different locations.

Now many companies provide mobile computing devices for their employees so that they can be available to the company at almost any time. This may require a user to access multiple company mobile computing devices in addition to their personal mobile device.

Since the most mobile computing devices are not waterproof, a user is reluctant to put a mobile computing device down on a surface having any liquids. The user now tries to balance both mobile computing devices. Since mobile computing devices now have multitasking capability, one can check the weather, calendar, or access the Internet in addition to having a phone conversation. This may be done on the screen of one of the mobile computing device while operating on the other mobile computing device. The user is now in a position of manipulating a mobile computing device, while speaking on it and holding a secondary mobile computing device.

Further, when the mobile computing device are both functioning as phones, if one receives a call on the second cell phone, the user is in the position of manipulating both phones.

With all of the simultaneous tasks, it is possible that the user may drop one of the cell phones. Since they are not shock resistant, dropping one of the cell phones can permanently damage it.

Additionally, the majority of the front of most mobile computing devices have transparent screens. Over time this screen becomes scratched. Since the screen is usually made from a glass material, it is possible that if the mobile computing device impacts an object, the screen will crack or break.

Currently, there is a need for means to hold two mobile computing devices allowing a user to speak on or manipulate either or both devices.

BRIEF DESCRIPTION OF THE DRAWINGS

The advantages of the system described in this application will become more apparent when read with the exemplary embodiment described specification and shown in the drawings. Further, in the accompanying drawings and description that follow, like parts are indicated throughout the drawings and description with the same reference numerals, respectively. The figures may not be drawn to scale and the proportions of certain parts have been exaggerated for convenience of illustration.

FIG. 8 shows an attachment system according to another embodiment of the current invention where the attachment elements are shown partially engaged, sliding lengthwise relative to each other.

FIG. 9 is an enlarged view of the partially engaged attachment elements as they slide past each other lengthwise.

SUMMARY

Figure 2:
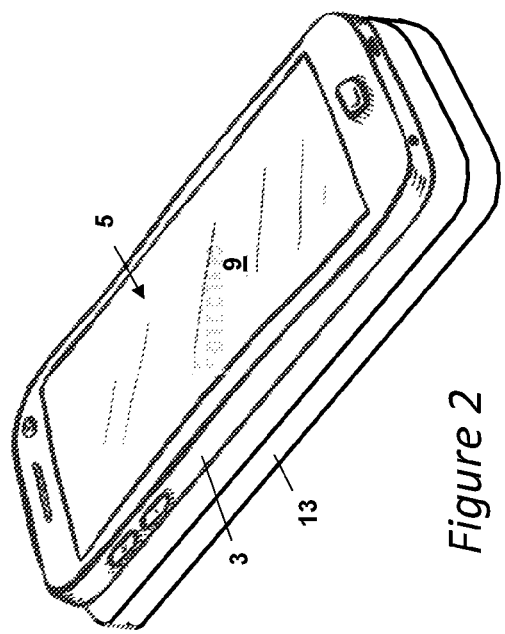
FIG. 2 is an illustration of the two cell phones attached using the attachment device of FIG. 1.

The current invention may be embodied as an attachment system for attaching a main mobile computing device, such as a mobile phone, computing tablet, or laptop computer having a screen side and a back side to a secondary mobile phone also having a screen side and a back side. It has a main attachment set attached to one side of the main mobile phone, and a secondary attachment set positioned and shaped to receive and attach to the main attachment set thereby holding the main mobile phone against the secondary mobile phone.

The invention may also be embodied as an attachment system for attaching a main mobile phone having a screen side and a back side to a secondary mobile phone also having a screen side and a back side having a main attachment set attached to one side of the main mobile phone and a secondary attachment set positioned and shaped to receive and attach to the main attachment set thereby holding the main mobile phone against the secondary mobile phone.

The current invention may also be described as a phone case enclosing a cell phone that has a screen side and a back side. The phone case is adapted to protect the screen and is also adapted to hold the cell phone in a position allowing use of the phone. It includes at least one main attachment element attached to the screen side of the phone, and at least one secondary attachment element attached to a fixed surface. The secondary attachment elements are adapted to releasably attach to at least one of the main attachment elements, thereby protecting the screen of either phone from scratches and damage, or exposing the screen to allow use of the either phone.

The current invention may be embodied as an attachment system for attaching a main mobile phone having a screen side and a back side to a secondary mobile phone also having a screen side and a back side. It includes a main attachment set attached to one side of the main mobile phone and a secondary attachment set positioned and shaped to receive and attach to the main attachment set thereby holding the main mobile phone flat against the secondary mobile phone.

DETAILED DESCRIPTION

The present invention will now be described in detail by describing various illustrative, non-limiting embodiments thereof with reference to the accompanying drawings. The invention may, however, be embodied in many different forms and should not be construed as being limited to the illustrative embodiments set forth herein. Rather, the embodiments are provided so that this disclosure will be thorough and will fully convey the concept of the invention to those skilled in the art. The claims should be consulted to ascertain the true scope of the invention.

1. Theory

As indicated above, more people are now carrying more than one mobile devices, such as a mobile phone, computing tablet or other computing device which one can carry with them. Since they will be damaged if they are wet, or dropped, and are now usually larger than one can comfortably put into a pocket, they are typically carried by hand. If the user gets distracted, he/she may lose, drop or damage one of the phones.

In addition, since the user may be intermittently speaking on, and or selecting buttons, or typing on the screen of one or both of them, there is a need for the current invention.

2. Implementation

The current invention may be implemented as attachment elements that are part of a case enclosing the mobile computing device, such as a mobile phone. In another embodiment, it may be attachment elements which are attached to a mobile computing device, and in another embodiment, they attachment elements may be formed as part of the mobile computing device. These embodiments will be described further below.

Figure 1:
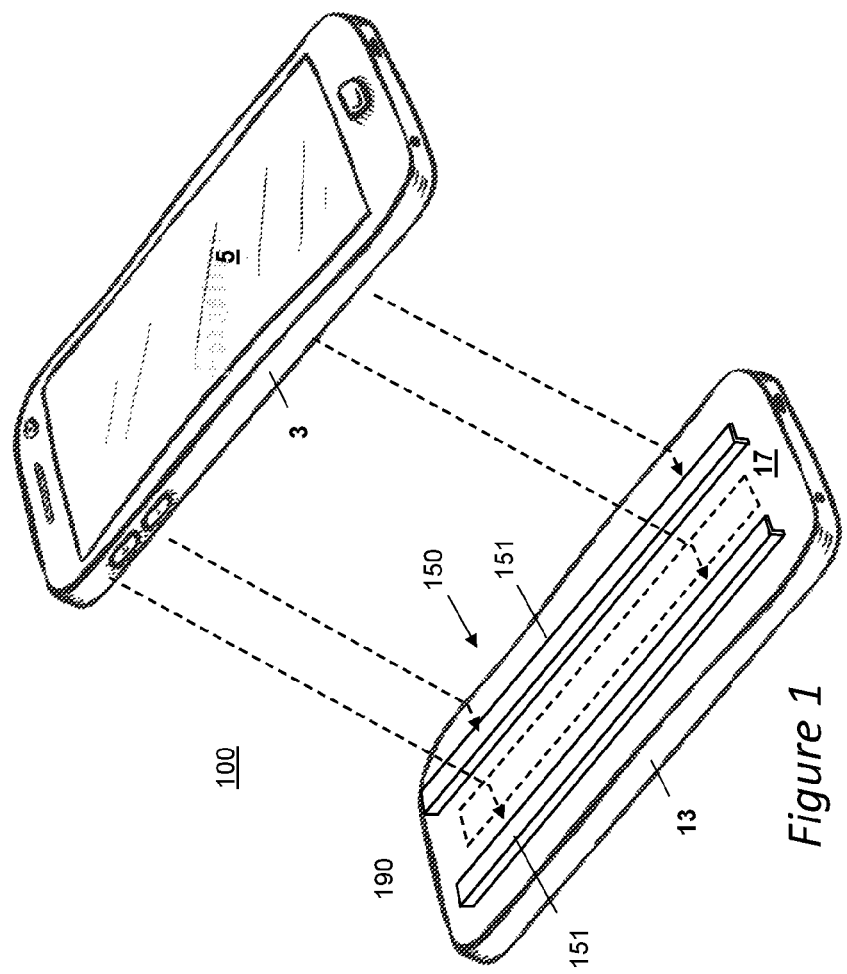
FIG. 1 is an illustration of a main cell phone being attached to the side of a secondary phone not having a screen (a "back side") employing an attachment system according to one embodiment of the current invention.

FIG. 1 is an illustration of a main cell phone 3 being attached to the side of a secondary phone 13 not having a screen 19 (the "back side") employing an attachment system 100 according to one embodiment of the current invention.

In this view a screen side 5 of main phone 3 is seen. On the backside 7 of main phone 3 there is a main attachment set not visible from this view.

Secondary phone 13 is illustrated here with its back side 17 visible having a secondary attachment set 150. In this embodiment the secondary attachment set employs elongated rails such as secondary attachment elements 151. As is shown by the dashed arrows, the main phone is positioned downward to meet the backside 17 of secondary phone 13 and slid to the left to engage main attachment elements on the back side of main phone 3 to the secondary attachment elements 151 of secondary phone 13.

Alternatively, a compressible friction element 190 may be placed between the attachment elements 151 to cause pressure and to have friction to prevent the attachment elements from sliding apart.

FIG. 2 is an illustration of the two cell phones, 3, 13 attached using the attachment device of FIG. 1. As is shown in FIG. 2, main phone 3 is now securely attached to secondary phone 13. They are attached and used in the manner that screen side 5 of main phone 3 is accessible to a user, who may speak on the phone buttons on the screen 9, or otherwise interact with screen 9 as the user would if it were not attached to secondary phone 13.

Figure 3:
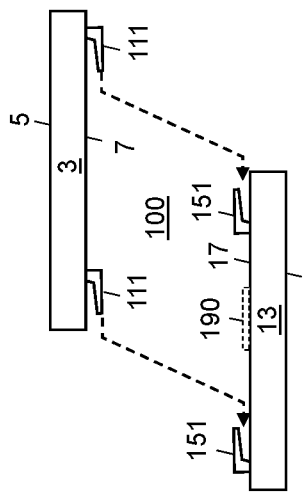
FIG. 3 is an illustration of the two cell phones of FIG. 1 from above showing the attachment elements.

FIG. 3 is an illustration of the two cell phones 3, 13 of FIG. 1 from above showing the attachment elements 111, 151, respectively. Here it can more clearly be seen that main attachment elements 111 fit into and engage secondary attachment elements 151. As indicated above an optional friction element 190 keeps pressure between attachment elements 111, 151, preventing them from slipping relative to each other.

Figure 4:
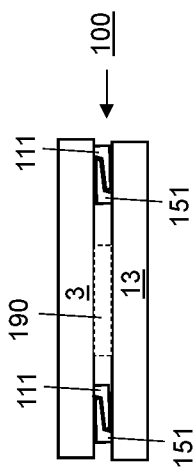
FIG. 4 is a view from above the two cell phone of FIG. 2 that have been attached using an attachment system according to one embodiment of the current invention.

FIG. 4 is a view from above the two cell phones 3, 13 of FIG. 2 that have been attached using an attachment system 100 according to one embodiment of the current invention. FIG. 4 shows main phone 3 attached to secondary phone 13 using attachment system 100 such that screen side 5 of main phone 3 is accessible from one side and screen side 15 of secondary phone 13 is accessible from the other side of the attached phones. As indicated above, this attachment method allows a user to speak on, interact with the screen, or otherwise use either phone simply by flipping it around and interacting with the other side of the combined phones.

Figure 5B:
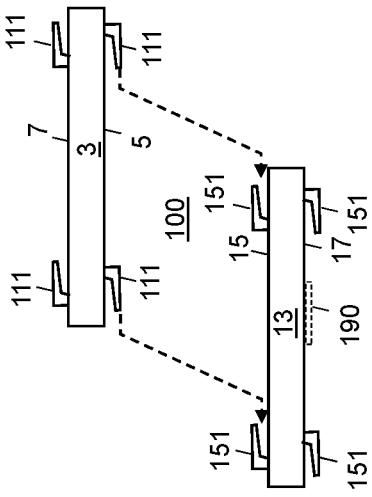
FIG. 5B is a view from above illustrating the screen side of the secondary phone being attached to the screen side of the main phone.
Figure 5A:
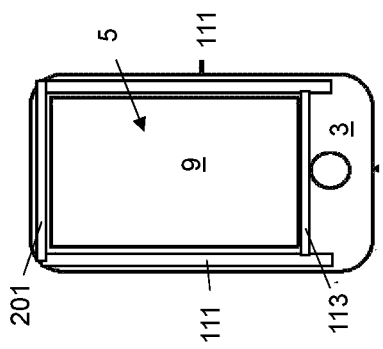
FIG. 5A illustrates attachment elements being mounted on the side of the cell phone having the screen, referred to as the "screen side" of the main phone.

FIG. 5A illustrates attachment elements 111 being mounted on the screen side 5 of the main phone 3. By having attachment elements 111 on the screen side 5 of main phone 3, it may be attached to secondary phone 13 with the screen side 5 being between the two phones as shown in FIGS. 5B and 6.

FIG. 5B is a view from above illustrating the screen side 5 of the main phone 3 being attached to the back side 7 of the main phone 3. Even though this does not allow access to the screen side 5 of main phone 3, it does protect the screen side 5 from scratches or damage to its screen 9.

Figure 6:
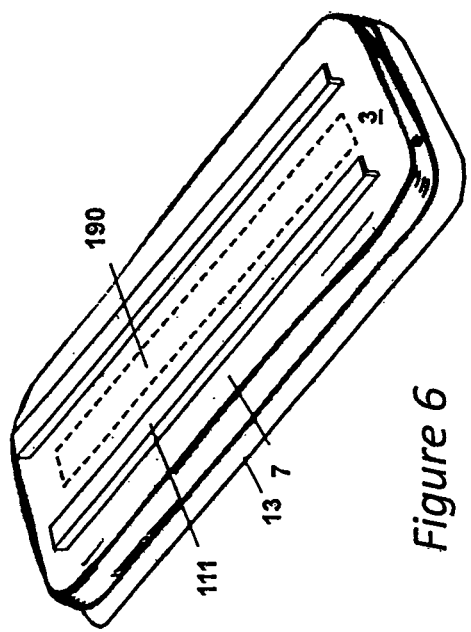
FIG. 6 shows the screen side of the secondary phone attached to the main phone.

FIG. 6 shows the screen side of the main phone 3 attached to the secondary phone 13 protecting the screen of the main phone when it is not in use. Here the unused attachment elements 111 are seen.

Alternative Embodiments

Since the attachment elements may be attached to both sides of both phones, they can be used in several ways. Also, the attachment elements 111, 151 are designed to be readily attached and unattached. Therefore, the phones may be attached to each other with the back side 7 of the main phone 3 attached to screen side 15 of the secondary phone. In this arrangement, the main phone 3 may be used in a normal fashion and the secondary phone 13 is attached with its screen against the back side 7 of the main phone, protecting it.

This can be done in reverse with the screen side 15 of secondary phone 13 being accessible and the screen side of the main phone 3 being attached to the secondary phone 13 and being protected.

The screen sides 5, 15 may be attached together to protect both screens, such as when they are being transported.

The back sides 7, 17 of both phones may be attached to allow the user to interact with the screens of both phones.

Users typically buy a cell phone cover to protect the phones if dropped. The above attachment elements 11, 151 may be built into one or both of the phones, or made part of the cover which can be added to either or both phones.

In another alternative embodiment, they may be attached to the phone. If attached to the phone, they must be in proper location and alignment to attach to other attachment elements. Therefore, they may require spacers, such as front spacers 201 as shown in FIG. 5A. These will provide the proper spacing and alignment between the attachment elements.

Figure 7:
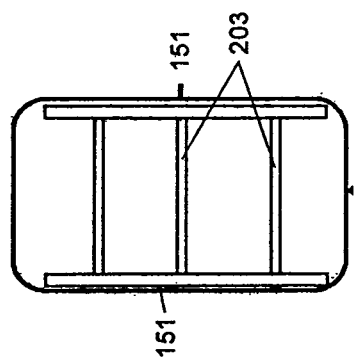
FIG. 7 shows spacers on the back side of a phone holding secondary attachment elements a predetermined distance apart so that they may attach to other attachment elements.

FIG. 7 shows spacers 203 on the back side of a phone holding attachment elements 111, 151 a predetermined distance apart so that they may attach to attachment elements of another phone.

In still another embodiment, the spacers and attachment means of FIGS. 5A and/or 7 may be combined into a single unit that can be attached to phones, which has the exact spacing and alignment to attach to other attachment elements.

In still another embodiment, an attachment set may be attached to a surface such as a wall or table which can receive and hold attachment elements on either the screen side or the back side of a phone. Attaching to the screen side holds and protects the screen from damage. Attaching the back side allows one to speak on, interact with the screen, and watch videos on the phone while the user's hands are free to do other things.

The attachment elements 111, 151 above are shown as elongated strips which are identical and attach by moving them in a direction perpendicular to their length. However, there can be other known attachment shapes that can be used. Attachment elements 111, 151 may be several short segments or individual fasteners. They may also be individual fasteners which are radially symmetric. These also may be made to slide into each other in a direction parallel to their length, or if made of flexible materials, snap into each other.

Figure 8:
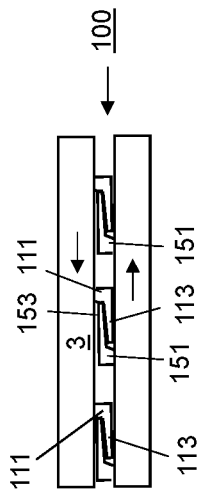
FIG. 8 shows a cross section of two compatible attachment elements.

FIG. 8 shows a cross section of two compatible attachment elements.

The embodiments shown here are for illustrative purposes and an exhaustive list of attachment means is not provided. Any known conventional attachment means may be employed to achieve the same result as described in this application.

FIG. 8 shows an attachment system 100 according to another embodiment of the current invention where the attachment elements 111, 151 are shown partially engaged, sliding lengthwise relative to each other. In this embodiment, attachment elements 111 are elongated ends parallel to each other, having a spacing between them which is slightly smaller than the width of attachment elements 151. Elements 151 are also elongated and parallel and have a spacing between them which is slightly smaller than the width of attachment elements 111.

Therefore, attachment elements 111 was partially fit into attachment elements 151 and slide in a direction parallel to their length.

Figure 9:
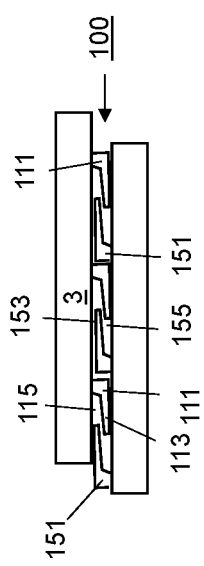
FIG. 9 shows a cross section of two other compatible attachment elements.
Figure 11:
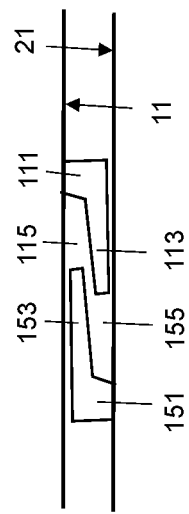
FIG. 11 shows a docking structure according to one embodiment of the present invention.

FIG. 9 is an enlarged view of the partially engaged attachment elements 111, 151 as they slide past each other lengthwise. In FIG. 11 it can be seen that attachment element 111 has a structure with extends to the left called extension 113. This creates a gap between extension 113 and surface 11 to which attachment element 111 is attached. This gap is referred to as groove 115.

Similarly, attachment element 151 is attached to, or protrudes from surface 21 and has an extension 153 extending to the right and partially into groove 115. Extension 153 and surface 21 create a groove 155. Extension 113 partially fits into groove 155. This partial insertion of the extensions into the grooves is referred to as partially engaged.

Since these are partially engaged they are not allowed to pull away from each other, however they are allowed to slide relative to each other in the same direction as the elongated attachment elements. Since they are only partially engaged, there is very little friction and they are allowed to easily slide.

Figure 10:
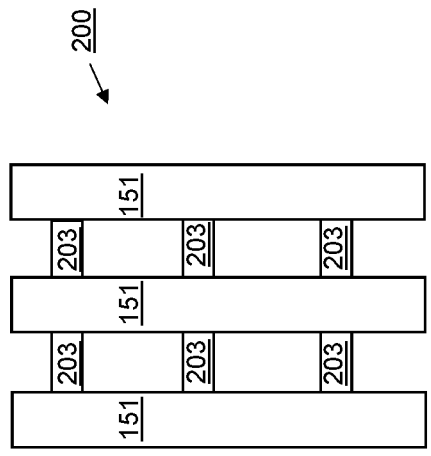
FIG. 10 shows the attachment elements of FIGS. 8 and 9 that have been moved perpendicular to their length into a fully engaged and locked position.

FIG. 10 shows the attachment elements of FIGS. 8 and 9 that have been moved perpendicular to their length into a fully engaged and locked position.

Once the attachment means have been cited into the correct position with respect to the other attachment means they can then be moved in a direction perpendicular to the length of the elongated attachment means is shown by the arrows in this figure. This causes full engagement in which the extensions 113, 153 fill grooves 155, 115, respectively. This causes the attachment means to lock in place restricting movements in a direction parallel to the length of the attachment elements 111, 151. Therefore, the attachment system described herein allow for a simple and easy to use device which allows main attachment means 111 to partially engaged ends slide relative to secondary attachment means 151 until they are at the proper location, then move attachment means 111 relative to attachment means 151 in a direction perpendicular to the length of attachment means 111, 151, to lock them in place.

When trying to detach attachment means 111 from 151, the process is reversed. It starts by moving attachment means 111 relative to attachment means 151 in the direction opposite the arrows of FIG. 10, then moving attachment means 111 relative to the attachment means 151 in a direction parallel to the length of the attachment means until they are unattached.

In another embodiment, there is a stop which stops this sliding in the direction along the length of the attachment means when the two attachment means are in the proper position relative to each other.

FIG. 13 show a docking structure 200 according to one embodiment of the present invention. Docking structure 200 employs attachment elements 151, as shown in FIGS. 10-12. These attachment elements 151 are designed to interact with, and hold attachment elements 111 on the mobile phone. Spacers 203 are implemented to keep attachment elements 151 a fixed distance apart and parallel so that they are in proper location and orientation to interact with other attachment elements.

Even though 3 attachment elements 151 are shown, 2 or more elements may be used on each surface that is intended to be attached.

Docking structure 200 can also use any conventional attachment means. Docking structure 200 is intended to be temporarily or permanently fixed to a surface to receive and hold a mobile phone, tablet, or other mobile computing device. Since users typically carry their phone with them almost everywhere, it is difficult to keep track of it. With this docking structure 200, attached to a surface such as a wall in a visible location, the user need only to look at the wall to see if the phone is there.

It is intended that more than one docking structure 200 may be used, and that the user has one mounted at their home, in their office, and their car such that there is always a visible location to hold your phone so that it will not be misplaced.

It has been described above that a mobile phone is connected to another mobile phone or to a docking structure however it should be known that this may be used with other devices such as tablets, laptops, or combinations of these. For example, one may have an iPad and the mobile phone and be able to connect the mobile phone to the back of the iPad such that when he/she is using the iPad they can remain confident that they will not misplace their mobile phone.

In further alternative embodiments, docking structure may be also connected with charging means, or inductive charging to charge the phone while it is holding the phone.

While the present disclosure illustrates various aspects of the present teachings, and while these aspects have been described in some detail, it is not the intention of the applicant to restrict or in any way limit the scope of the claimed systems and methods to such detail. Additional advantages and modifications will readily appear to those skilled in the art. Therefore, the teachings of the present application, in its broader aspects, are not limited to the specific details and illustrative examples shown and described. Accordingly, departures may be made from such details without departing from the spirit or scope of the teachings of the present application. Moreover, the foregoing aspects are illustrative, and no single feature or element essential to all possible combinations may be claimed in this or a later application.

What is claimed is:

1. An attachment system for attaching a main mobile device having a screen side and a back side to a secondary mobile device also having a screen side and a back side comprising:
   a. a main attachment set attached to one side of the main mobile device; and
   b. a secondary attachment set positioned and shaped to receive and attach to the main attachment set thereby holding the main mobile device against the secondary mobile device, wherein the main and secondary attachment sets are "L" shaped, thereby creating a longitudinal groove;
   c. wherein:
      the main attachment set is shaped to be capable of attaching to the secondary attachment set; and
      the secondary attachment set is shaped to be capable of attaching to the main attachment set.

2. The attachment system of claim 1, wherein the main attachment set is attached to the back side of the main mobile device exposing the screen side allowing a user to talk on, and otherwise use main mobile device.

3. The attachment system of claim 1, wherein the main attachment set is attached to the screen side of the main mobile device allowing the screen side of the main mobile device to attach to one side of the secondary mobile device protecting the screen side of the main mobile device from scratches and damage.

4. The attachment system of claim 1, wherein the secondary attachment set is attached to the back side of the secondary mobile device exposing the screen side allowing a user to talk on, and otherwise use secondary mobile device.

5. The attachment system of claim 1, wherein the secondary attachment set is attached to the screen side of the secondary mobile device attaching the screen side of the secondary mobile device to one side of the main mobile device protecting the screen side of the secondary mobile device from scratches and damage.

6. The attachment system of claim 1, wherein the main attachment set is comprised of attachment elements on the main mobile device which attach to attachment elements of the secondary mobile device.

7. The attachment system of claim 6, wherein the main attachment set further comprises:
   spacers which space the attachment elements a defined distance apart to interconnect with the secondary attachment elements of the secondary mobile device.

8. An attachment system for attaching a main mobile device having a screen side and a back side to a secondary mobile device also having a screen side and a back side comprising:
   a. a plurality of main attachment elements attached to one side of the main mobile device; and
   b. a plurality of secondary attachment elements positioned and shaped to receive and attach to the main attachment elements thereby holding the main mobile device to the secondary mobile device, wherein the main and secondary attachment elements are "L" shaped, thereby creating a longitudinal groove;
   c. wherein:
      at least one of the plurality of main attachment elements is shaped to be capable of attaching to at least one of the plurality of secondary attachment elements; and
      at least one of the plurality of the secondary attachment elements is shaped to be capable of attaching to at least one of the plurality of main attachment elements.

9. The attachment system of claim 8, wherein the main attachment elements are attached to the back side of the main mobile device exposing the screen side allowing a user to talk on, and otherwise use the main mobile device.

10. The attachment system of claim 8, wherein the attachment elements are attached to the screen side of the main mobile device and removeably attached to one side of the secondary mobile device, thereby protecting the screen side of the main mobile device from scratches and damage.

11. The attachment system of claim 8, wherein the attachment elements are attached to the back side of the main mobile device exposing the screen side of the main mobile device allowing a user to talk on, and otherwise use it.

12. The attachment system of claim 8, wherein the attachment elements are attached to the screen side of the secondary mobile device attaching the screen side of the secondary mobile device to one side of the main mobile device protecting the screen side of the secondary mobile device from scratches and damage.

13. The attachment system of claim 8, wherein the attachment system further comprises:
   spacers which space the attachment elements a defined distance apart to interconnect with the attachment elements of the secondary mobile device.

14. An attachment system adapted to hold a cell phone having a screen on a screen side and a back side in a position allowing use of the cell phone comprising:
   a. at least one main attachment element attached to the back side of the cell phone; and b. at least one secondary attachment element attached to a fixed surface, adapted to releasably attach to at least one of the main attachment elements, thereby positioning the screen to face outward allowing the user to view the screen, interact with the screen and speak on the cell phone;

c. wherein a portion of the main attachment element that releasably attaches to a portion of the secondary attachment element has a substantially similar shape, wherein the at least one main attachment element and the at least one secondary attachment element are "L" shaped, thereby creating a longitudinal groove.

15. The attachment system of claim 14, further comprising:

a. at least one main attachment element attached to the screen side of the phone; and b. wherein the secondary attachment is releasably attached to the at least one of the main attachment elements on the screen side of the phone, thereby protecting the screen from scratches and damage.

16. The attachment system of claim 14, wherein the main attachment elements have a spacing between them slightly less than a width of the secondary attachment elements such that they must be partially engaged by sliding them relative to each other in a direction parallel to the attachment elements.

* * * * *